(12) United States Patent
Newstadt et al.

(10) Patent No.: US 8,959,609 B1
(45) Date of Patent: Feb. 17, 2015

(54) OUT-OF-APP BASED PARTNER AWARE USER AUTHENTICATION

(71) Applicant: Symantec Corporation, Mountain View, CA (US)

(72) Inventors: Keith Newstadt, West Newton, MA (US); Petrus Johannes Viljoen, Redondo Beach, CA (US); Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/931,067

(22) Filed: Jun. 28, 2013

(51) Int. Cl.
G06F 17/30 (2006.01)
H04L 29/06 (2006.01)

(52) U.S. Cl.
CPC .................... *H04L 63/0884* (2013.01)
USPC ............................................... 726/9; 713/171

(58) Field of Classification Search
CPC ........................... G06F 21/34; H04L 63/0853
USPC ............................................... 726/9; 713/171
See application file for complete search history.

(56) References Cited

U.S. PATENT DOCUMENTS

| 8,417,952 | B2* | 4/2013 | Cheng et al. | 713/171 |
| 8,453,226 | B2* | 5/2013 | Hammad | 726/9 |
| 2009/0300747 | A1* | 12/2009 | Ahn | 726/9 |
| 2011/0055567 | A1* | 3/2011 | Sundaram et al. | 713/169 |
| 2012/0066757 | A1* | 3/2012 | Vysogorets et al. | 726/9 |
| 2012/0204032 | A1* | 8/2012 | Wilkins et al. | 713/170 |
| 2013/0111208 | A1* | 5/2013 | Sabin et al. | 713/171 |
| 2013/0247147 | A1* | 9/2013 | Pontillo et al. | 726/3 |

* cited by examiner

Primary Examiner — Saleh Najjar
Assistant Examiner — Oleg Korsak
(74) Attorney, Agent, or Firm — Brill Law Office; Jeffrey Brill (57) ABSTRACT

An app runs on a user operated computing device, e.g., a mobile device running a sandboxed operating system. The app requests a session ID from a publisher Idp. The app registers for notifications on the session ID with a notification service. The app directs a browser to navigate to the publisher IdP, and to pass it the secure session ID and an ID of a specific partner. The publisher IdP returns a redirect to a third party IdP used by the specific partner to authenticate users. The browser navigates to the third party IdP, which prompts the user for authentication credentials. The third party Idp uses the credentials to authenticate the user, and redirects the authentication result to the publisher IdP. The publisher IdP sends the app a notification, via the notification service. In response, the app calls the publisher IdP, and receives a secure authentication token.

20 Claims, 4 Drawing Sheets

OUT-OF-APP BASED PARTNER AWARE USER AUTHENTICATION

TECHNICAL FIELD

This disclosure pertains generally to apps for mobile computing devices, and more specifically to using out-of-app based partner aware user authentication in partner aware apps in different environments, including but not limited to sandboxed operating systems.

RELATED APPLICATION

This application is related to co-pending utility application Ser. No. 13/920,006, titled "Provisioning Partner Aware Apps on Sandboxed Operating Systems" (the "App Provisioning Application"). The App Provisioning application was filed on Jun. 17, 2013, and has the same inventors, assignee and applicant as the present application. The App Provisioning application is incorporated herein by reference in its entirety.

BACKGROUND

Mobile computing devices such as smartphones and tablet computers are becoming more widely used every day. There are multiple mobile operating systems available for different mobile computing devices, each with a wide variety of available apps. Users can install apps on their mobile devices by downloading them from an online app store that provides apps for their particular mobile operating system.

Apple's iOS (formerly known as iPhone OS) is a mobile operating system that runs on Apple mobile devices such as the iPhone, the iPad and the iPod Touch. Many applications ("apps") for iOS are available for download from Apple's App Store. Android is an open-source, Linux based operating system for mobile devices. A large community of developers write apps that run on Android devices. Android apps are available online through Google Play (formerly the Android Market). Windows Phone is a mobile operating system developed by Microsoft. Users can download apps for Windows Phone from Microsoft's Windows Phone Marketplace. Apps for Windows Metro (the tile-based "modern UI" component of Windows 8) and Windows RT (a version of Windows 8 for portable devices based on ARM processors such as Microsoft's Surface Tablet) can be purchased and downloaded from Microsoft's Windows Store. Another example of a mobile operating system is Blackberry OS (the latest version is Blackberry 10) from BlackBerry Limited (formerly Research In Motion). Blackberry OS apps are downloaded from the BlackBerry World Storefront.

Many mobile operating systems such as iOS, Android and Windows Phone run each app in a separate sandbox, which is an isolated area that does not have access to the rest of the system's resources, unless permissions are explicitly granted. A sandbox is a tightly controlled environment, providing limited areas of storage and memory for the app, and restricting or disallowing access to system and hardware resources such as network, input devices, current location, contacts, etc. Typically, a sandboxed app is only allowed to access files inside its own storage area, and cannot change system settings. Operating systems that runs apps in this manner are sometimes referred to as sandboxed operating systems. In addition to operating systems for tablets, smartphones and the like, some operating systems for laptop and desktop computers also run sandboxed apps, such as Windows 8 and MacOS.

Providers of apps, such as commercial software publishers, often create partnerships with separate organizations, such as internet service providers (ISPs) or retailers. Under these partnerships, it is desirable to provide partner specific branding, authentication and other targeted features as part of the app. In this context, a given software publisher may enter into separate arrangements with multiple parties to provide partner specific versions of the same underlying app. For example, a publisher of a security app may have a partnership with an ISP, a separate partnership with a retailer of tablets and a third partnership with a cell phone carrier. In this case, it would be desirable for the app provider to distribute a separate, partner-aware version of the security app to each partner's customers (e.g., the ISP subscribers, the tablet purchasers and the cellular service customers). In other words, each partner wants a version of the app to be provided to its customers that includes its own specific branding and other targeted features.

One feature the partners often want in such a scenario is to provide their own authentication of users. Providing third party authentication securely for a partner within an app creates some specific difficulties. This issue is compounded by the fact that providing third party authentication for multiple partners from a single app requires integrating with multiple third party authentication services and identity providers ("IdPs"). An identity provider (IdP), sometimes called an identity service provider or identity assertion provider, is an online service or website that authenticates users by means of security tokens (sometimes called identity tokens, authentication tokens or software tokens). Note that many service providers are also IdPs, and an IdP can provide services in addition to identity services.

Conventionally, secure third party authentication is performed via a browser, using industry standards such as SAML, OpenID and OAuth, which support authentication by multiple IdPs. However, this is not practicable for an app on a sandboxed operating system. The app can initiate the authentication process through the browser, but the sandboxed nature of the operating system makes it impossible to communicate an authenticated identity back from the browser to the app.

It would be desirable to address these issues.

SUMMARY

An app runs on a user operated computing device, such as a mobile device running a sandboxed operating system. Out-of-app based third party authentication of the user is performed, for a specific partner of the app publisher. The app requests and receives a secure session ID ("session ID") from an identity provider of the app publisher ("the publisher Idp"). The app registers for notifications on the secure session ID with a notification service. The app then directs a browser to navigate to the publisher IdP, and to pass it the secure session ID and a partner identifier ("partner ID") of the specific partner as parameters. The publisher IdP returns (and the browser receives) a redirect (e.g., an HTTP 302 redirect) to a third party identity provider ("third party IdP") used by the specific partner to authenticate users, the redirect being based on the partner ID. The browser navigates to the third party IdP, responsive to the received redirect. The third party IdP prompts the user for authentication credentials, which are entered by the user and transmitted to the third party IdP by the browser. The third party Idp uses the credentials to authenticate the user, and redirects the authentication result to the publisher IdP (e.g., using SAML). The publisher IdP sends a notification on the session ID that the third party IdP successfully authenticated the user, and the app receives the notification from the notification service. In response, the app calls the publisher IdP with the session ID, and receives a secure authentication token, which the app can use to login to multiple publisher provided services. In some cases, the app uses an additional third party IdP to authenticate the user to an additional partner.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
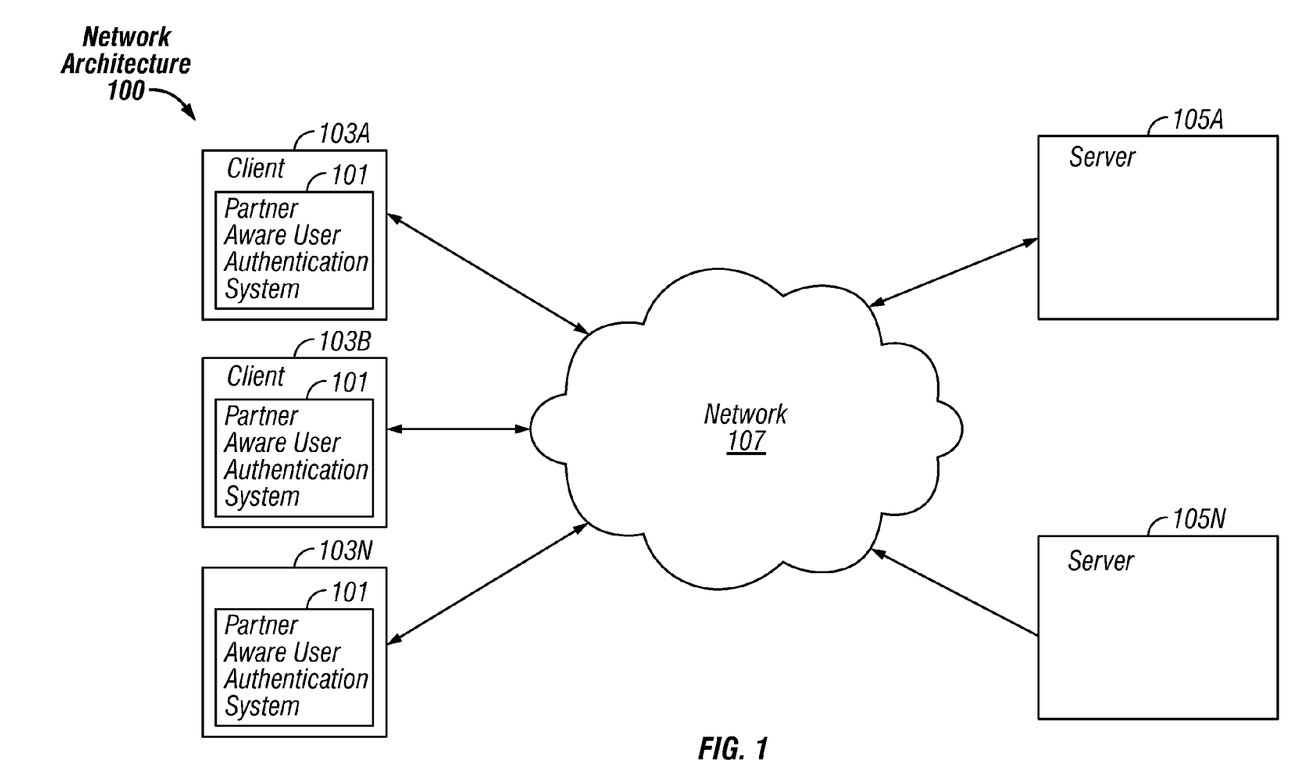
FIG. 1 is a block diagram of an exemplary network architecture in which a partner aware user authentication system can be implemented, according to some embodiments.

FIG. 1 is a block diagram illustrating an exemplary network architecture 100 in which a partner aware user authentication system 101 can be implemented. The illustrated network architecture 100 comprises multiple clients 103A, 103B and 103N, as well as multiple servers 105A and 105N. In FIG. 1, a partner aware user authentication system 101 is illustrated as residing on each client 103A-N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of mobile computing devices 311, comprising portable computer systems 210 capable of connecting to a network 107 and running applications. Such mobile computing devices 311 are sometimes referred to as smartphones, although many mobile phones not so designated also have these capabilities. Tablet computers are another example of mobile computing devices 311.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
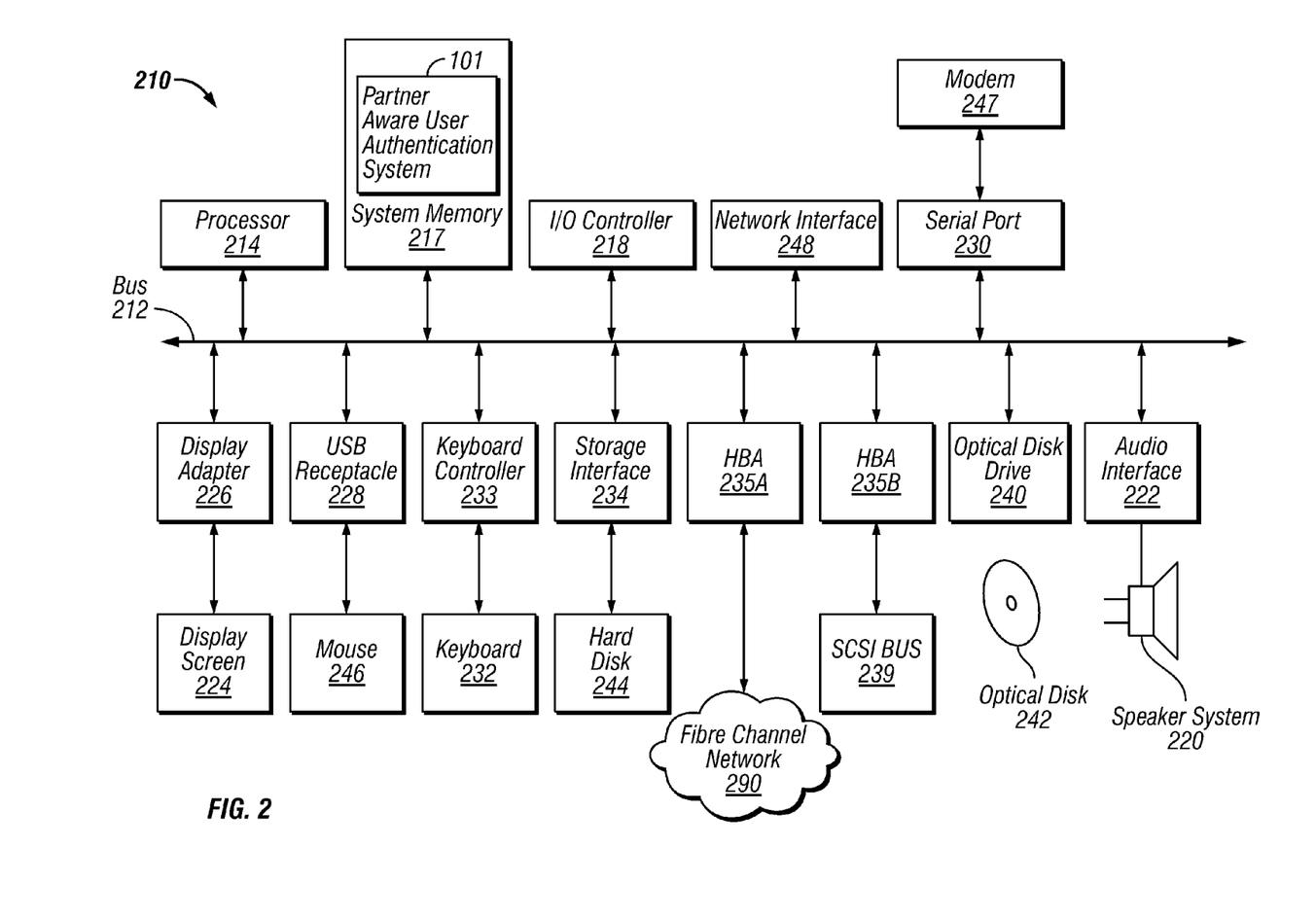
FIG. 2 is a block diagram of a computer system suitable for implementing a partner aware user authentication system, according to some embodiments.

FIG. 2 is a block diagram of a computer system 210 suitable for implementing a partner aware user authentication system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 311 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the partner aware user authentication system 101 is illustrated as residing in system memory 217. The workings of the partner aware user authentication system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
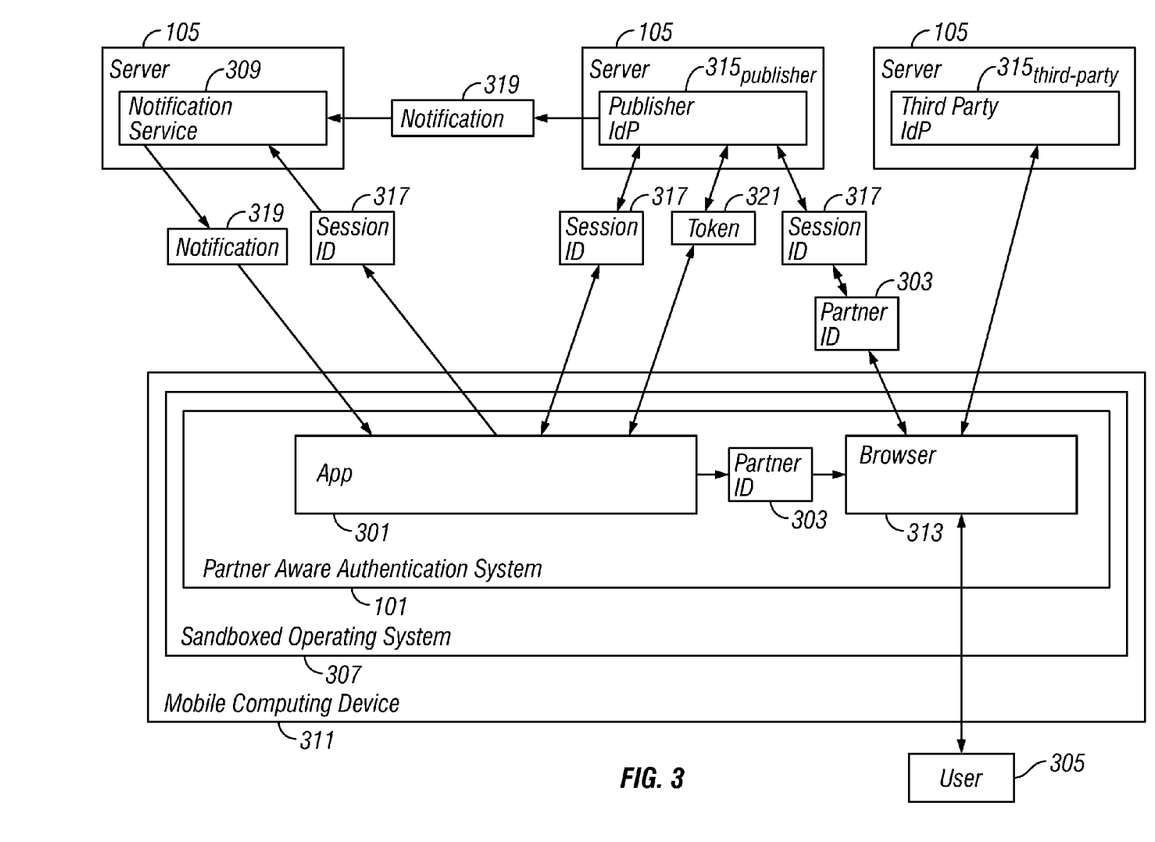
FIG. 3 is a block diagram of the operation of a partner aware user authentication system, according to some embodiments.

FIG. 3 illustrates the operation of a partner aware user authentication system 101, according to some embodiments. As described above, the functionalities of the partner aware user authentication system 101 can reside on a client 103, a server 105, or be distributed between multiple computer systems 210, including within a cloud-based computing environment in which the functionality of the partner aware user authentication system 101 is provided as a service over a network 107. It is to be understood that although the partner aware user authentication system 101 is illustrated in FIG. 3 as a single entity, the illustrated partner aware user authentication system 101 represents a collection of functionalities, which can be instantiated as a single or multiple modules as desired (an instantiation of specific, multiple modules of the partner aware user authentication system 101 is illustrated in FIG. 3). It is to be understood that the modules of the partner aware user authentication system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the partner aware user authentication system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a partner aware user authentication system 101 runs on a user 305 operated mobile computing device 311 (e.g., a smartphone or tablet) with a sandboxed operating system 307 (e.g., iOS, Windows Phone, etc.). In other embodiments, the partner aware user authentication system 101 runs on a desktop or laptop computer 210 running a sandboxed operating system 307 such as MacOS. Although particularly useful in the context of sandboxed operating systems 307, in some embodiments the functionality of the partner aware user authentication system 101 described herein is implemented and utilized on a non-sandboxed operating system (not illustrated). As described in detail below, the partner aware user authentication system 101 enables a single app 301 to perform third party authentication, even where the app 301 runs on a sandboxed operating system 307, and even where a single version of the app 301 is downloaded from an app store for use with multiple partners, each of which requires the use of separate third party authentication.

FIG. 3 also illustrates three servers 105, one of which hosts a notification service 309, another of which hosts an identity provider ("IdP") $315_{publisher}$ of the organization that provides the app 301 (herein called the app publisher), and the third of which hosts the third party IdP $315_{third\_party}$ used by the partner to authenticate users 305. For illustrative clarity, FIG. 3 depicts only a single third party IdP $315_{third\_party}$, but it is to be understood that multiple third party IdPs $315_{third\_party}$ can be deployed, each one providing user authentication for a specific partner.

As illustrated in FIG. 3, the partner aware user authentication system 101 uses an out-of-app 301, browser 313 based flow to provide third party authentication of the user 305 to the app 301. In order to start the process, the app 301 obtains a partner identifier ("partner ID") 303 identifying the specific partner to provide the authentication. As used herein "partner ID 303" means any data specifically denoting a particular partner in a format that can be read by the app 301, to determine the identity of the specific partner. The partner ID 303 can be in different formats in different embodiments (e.g., a string comprising the name of the partner, a number uniquely associated with a specific partner, etc.). In one embodiment, the app 301 uses the functionality described in the related App Provisioning Application to obtain the partner ID 303. In other embodiments, the app obtains the partner ID 303 other ways (e.g., by prompting the user 305, by reading administrator provided data within its sandbox, etc.).

The app 301 makes a request to the publisher IdP $315_{publisher}$ for a secure session identifier (session ID) 317, which is returned by the IdP $315_{publisher}$ to the app 301. As used herein, a "session ID" 317 means data that is used in network communications to identify a session, which is a series of related message exchanges. The session ID 317 can be made secure against hijacking by utilizing randomness and/or length. The specific format of the session ID 317 as well as the requisite amount of randomness and length to utilize can vary between embodiments.

Once the app 301 receives the secure session ID 317 from the publisher IdP $315_{publisher}$, the app 301 proceeds to register for notifications on the secure session ID 317, using a conventional notification service 309. Thus, the notification service listens for notifications 319 on the secure session ID 317, and sends any notifications 319 to the registered app 301. The app 301 uses the browser 313 to navigate to the publisher IdP $315_{publisher}$, passing both the secure session ID 317 and the partner ID 303 as parameters. For example, the app 301 can launch the browser with the URL of the publisher IdP $315_{publisher}$, with the secure session ID 317 and the partner ID 303 as URL parameters. This directs the browser to navigate to the publisher IdP $315_{publisher}$, and pass it the secure session ID 317 and the partner ID 303.

The app publisher's IdP $315_{publisher}$ uses the partner ID 303 to redirect to the partner's IdP $315_{third\_party}$ for user 305 authentication. In order to redirect the user 305 from the app publisher's IdP $315_{publisher}$ to the partner's IdP $315_{third\_party}$ through the browser 313, an HTTP 302 redirect based on the partner ID 303 (or equivalent or similar functionality) can be used. The redirect is received by the browser 313, and causes the browser 313 to navigate to the partner's IdP $315_{third\_party}$.

The partner's IdP $315_{third\_party}$ prompts the user 305 to enter authentication credentials (e.g., username, password, etc.). The user 305 enters the credentials in response to the prompt, and the browser 313 transmits them to the partner's IdP $315_{third\_party}$.

The partner's IdP $315_{third\_party}$ then attempts to authenticate the user 305 based on the entered credentials. The partner's IdP $315_{third\_party}$ uses a protocol such as SAML or OpenID to redirect the authentication result (e.g., user successfully authenticated or authentication failed) back to the app publisher's IdP $315_{publisher}$. Having received a valid authentication result, the app publisher's IdP $315_{publisher}$ sends a notification 317 to the app 301 via the notification service 309 on the session ID 317. Because the app is registered with the notification service for the session ID 317, the app 301 receives the notification 309 from the notification service 309. In response to receiving a notification 317 of a successful authentication of the user 305, the app 301 calls the app publisher's IdP $315_{publisher}$, and passes it session ID 317. In response, the publisher's IdP $315_{publisher}$ provides the app 301 with a secure authentication token 321. The exact format of the authentication token 321 can vary between embodiments (e.g., a SAML token, an STS token, etc.). Once authenticated, the app 301 can then use the secure authentication token 321 to login to various sites and services provided by the app publisher.

Thus, the partner aware user authentication system 101 enables a single app 301 on a client computer 210, including an app 301 on a sandboxed operating system 307 on, e.g., a mobile device 311, to provide third party authentication. This is true even where a single version of the app 301 is downloaded from an app store for use with multiple partners, each of which requires the use of separate third party authentication.

Figure 4:
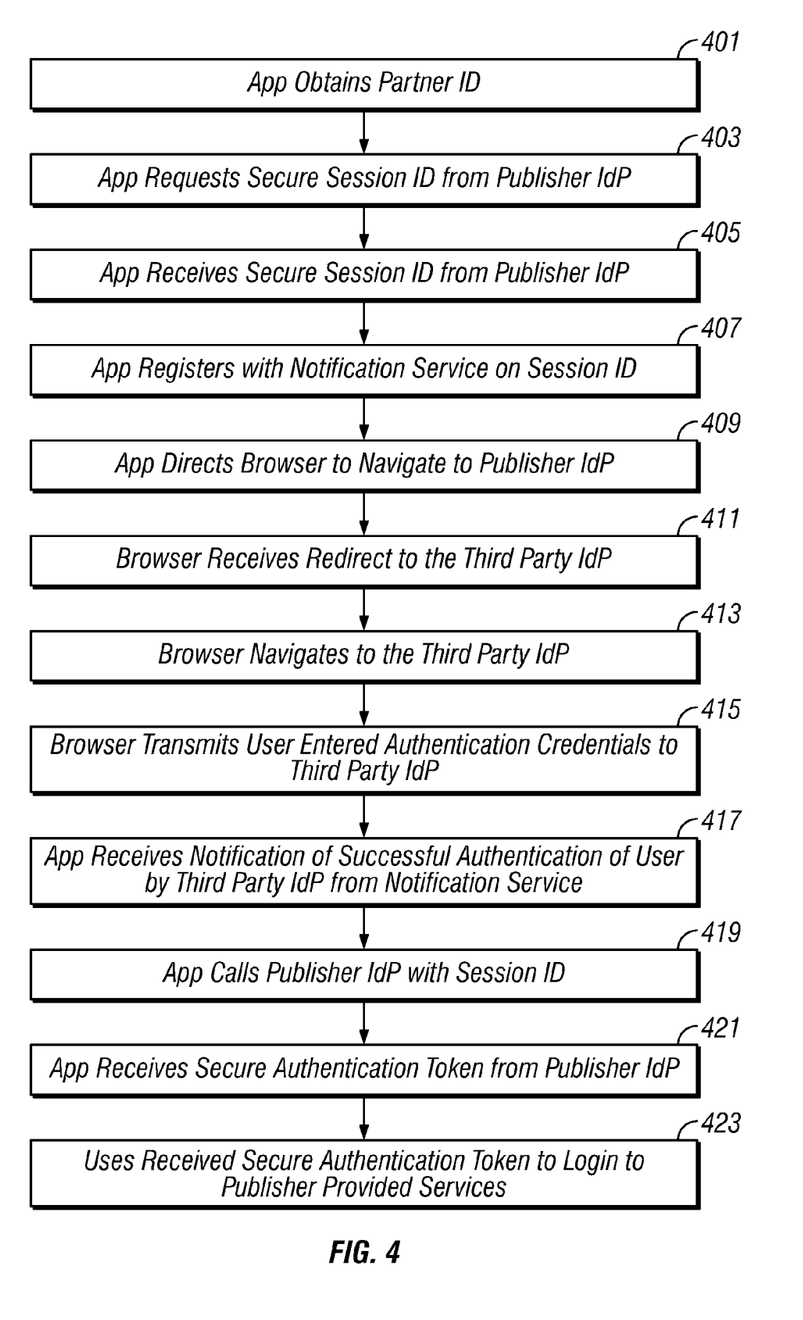
FIG. 4 is a flowchart of the operation of a partner aware user authentication system, according to some embodiments.

FIG. 4 illustrates steps of the operation of a partner aware user authentication system 101, according to some embodiments. The app 301 obtains 401 a partner ID 303 identifying the specific partner to provide the authentication. The app 301 then makes 403 a request to the publisher IdP $315_{publisher}$ for a secure session ID 317. In response to the request, the app 301 receives 405 a secure session ID 317 from the publisher IdP $315_{publisher}$. The app 301 then registers 407 with a notification service 309 for notifications on the secure session ID 317. The app 301 directs 409 the browser 313 to navigate to the publisher IdP $315_{publisher}$ with the secure session ID 317 and the partner ID 303. The browser 313 receives 411 a redirect to the third party IdP $315_{third\_party}$ used by the specific partner to authenticate users 305, from the publisher IdP $315_{publisher}$. (The publisher IdP $315_{publisher}$ bases the redirect on the partner ID 303.) In response to the redirect, the browser 313 navigates 413 to the third party IdP $315_{third\_party}$. The browser 313 transmits 415 authentication credentials entered by the user 305 to the third party IdP $315_{third\_party}$, which uses the transmitted authentication credentials to authenticate the user 305. The app 301 receives 417 a notification 319 on the session ID 317 that the third party IdP $315_{third\_party}$ successfully authenticated the user 305, from the notification service 309. (The notification 319 is sent by the publisher IdP $315_{publisher}$ in response to receiving a redirected authentication result from the third party IdP $315_{third\_party}$.) In response to receiving the notification 309 that the third party IdP $315_{third\_party}$ successfully authenticated the user 305, the app 301 calls 419 the publisher IdP $315_{publisher}$ with the session ID 317. The app receives 421 a secure authentication token 321 from the publisher IdP $315_{publisher}$, and uses 423 the received secure authentication token 321 to login to multiple publisher provided services.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for performing out-of-app based third party authentication of a user, by a partner aware app on a user operated computing device, wherein the third party authentication is performed according to a specific partner of a publisher of the app, the method comprising the steps of:
   requesting a secure session identifier from an identity provider of the publisher of the app, by the app on the computing device;
   receiving the secure session identifier from the identity provider of the publisher, by the app on the computing device;
   registering for notifications on the secure session identifier with a notification service, by the app on the computing device;
   directing a browser on the computing device to navigate to the identity provider of the publisher and to pass it, as parameters, the secure session identifier and a partner identifier of the specific partner, by the app on the computing device;
   receiving, from the identity provider of the publisher by the browser on the computing device, a redirect to a third party identity provider used by the specific partner to authenticate users, the redirect being based, by the identity provider of the publisher on the partner identifier;
   navigating to the third party identity provider, by the browser on the computing device, responsive to the received redirect;
   transmitting authentication credentials entered by the user in response to a prompt from the third party identity provider, by the browser on the computing device to the third party identity provider;
   receiving a notification on the session identifier that the third party identity provider successfully authenticated the user based on the transmitted authentication credentials, from the notification service by the app on the computing device, the notification having been sent from the identity provider of the publisher in response to receiving a redirected authentication result from the third party identity provider;
   calling the identity provider of the publisher with the session identifier, by the app on the client device, in response to receiving the notification that the third party identity provider successfully authenticated the user; and
   receiving a secure authentication token, from the identity provider of the publisher by the app on the client.

2. The method of claim 1 wherein:
   the app runs on a sandboxed operating system on the user operated computing device.

3. The method of claim 2 wherein the sandboxed operating system on the user operated computing device further comprises one from a group of sandboxed operating systems consisting of:
   iOS, MacOS, Windows Phone, Windows Metro, Windows RT, Android and Blackberry OS.

4. The method of claim 1 wherein:
   the user operated computing device further comprises a mobile computing device.

5. The method of claim 1 further comprising:
   obtaining the partner identifier of the specific partner, by the app on the computing device.

6. The method of claim 1 wherein the received redirect further comprises:
   a Hypertext Transfer Protocol ("HTTP") 302 redirect.

7. The method of claim 1 wherein:
   the third party identity provider uses Security Assertion Markup Language ("SAML") to redirect the authentication result to the identity provider of the publisher.

8. The method of claim 1 further comprising:
using a second third party identity provider to authenticate the user to a second partner, by the app on the computing device.

9. The method of claim 1 further comprising:
using the received secure authentication token to login to multiple publisher provided services, by the app on the computing device.

10. At least one non-transitory computer readable-storage medium for performing out-of-app based third party authentication of a user, by a partner aware app on a user operated computing device, wherein the third party authentication is performed according to a specific partner of a publisher of the app, the at least one non-transitory computer readable-storage medium storing computer executable instructions that, when loaded into computer memory and executed by at least one processor of a computing device, cause the computing device to perform the following steps:
requesting a secure session identifier from an identity provider of the publisher of the app, by the app on the computing device;
receiving the secure session identifier from the identity provider of the publisher, by the app on the computing device;
registering for notifications on the secure session identifier with a notification service, by the app on the computing device;
directing a browser on the computing device to navigate to the identity provider of the publisher and to pass it, as parameters, the secure session identifier and a partner identifier of the specific partner, by the app on the computing device;
receiving, from the identity provider of the publisher by the browser on the computing device, a redirect to a third party identity provider used by the specific partner to authenticate users, the redirect being based, by the identity provider of the publisher on the partner identifier;
navigating to the third party identity provider, by the browser on the computing device, responsive to the received redirect;
transmitting authentication credentials entered by the user in response to a prompt from the third party identity provider, by the browser on the computing device to the third party identity provider;
receiving a notification on the session identifier that the third party identity provider successfully authenticated the user based on the transmitted authentication credentials, from the notification service by the app on the computing device, the notification having been sent from the identity provider of the publisher in response to receiving a redirected authentication result from the third party identity provider;
calling the identity provider of the publisher with the session identifier, by the app on the client device, in response to receiving the notification that the third party identity provider successfully authenticated the user; and
receiving a secure authentication token, from the identity provider of the publisher by the app on the client.

11. The at least one non-transitory computer readable-storage medium of claim 10 wherein:
the app runs on a sandboxed operating system on the user operated computing device.

12. The at least one non-transitory computer readable-storage medium of claim 11 wherein the sandboxed operating system on the user operated computing device further comprises one from a group of sandboxed operating systems consisting of:
iOS, MacOS, Windows Phone, Windows Metro, Windows RT, Android and Blackberry OS.

13. The at least one non-transitory computer readable-storage medium of claim 10 wherein:
the user operated computing device further comprises a mobile computing device.

14. The at least one non-transitory computer readable-storage medium of claim 10 further storing computer executable instructions to perform the following additional step:
obtaining the partner identifier of the specific partner, by the app on the computing device.

15. The at least one non-transitory computer readable-storage medium of claim 10 wherein the received redirect further comprises:
a Hyptertext Transfer Protocol ("HTTP") 302 redirect.

16. The at least one non-transitory computer readable-storage medium of claim 10 further storing computer executable instructions to perform the following additional step:
the third party identity provider using Security Assertion Markup Language ("SAML") to redirect the authentication result to the identity provider of the publisher.

17. The at least one non-transitory computer readable-storage medium of claim 10 further storing computer executable instructions to perform the following additional step:
using a second third party identity provider to authenticate the user to a second partner, by the app on the computing device.

18. The at least one non-transitory computer readable-storage medium of claim 10 further storing computer executable instructions to perform the following additional step:
using the received secure authentication token to login to multiple publisher provided services, by the app on the computing device.

19. A user operated computing device for performing out-of app based third party authentication of a user, by a partner aware app on the user operated computing device, wherein the third party authentication is performed according to a specific partner of a publisher of the app, the user operated computing device comprising:
at least one processor;
system memory;
a sandboxed operating system residing in the system memory; and
a partner aware user authentication system residing in the system memory, the partner aware user authentication system being programmed:
to request a secure session identifier from an identity provider of the publisher of the app, by the app on the computing device;
to receive the secure session identifier from the identity provider of the publisher, by the app on the computing device;
to register for notifications on the secure session identifier with a notification service, by the app on the computing device;
to direct a browser on the computing device to navigate to the identity provider of the publisher and to pass it, as parameters, the secure session identifier and a partner identifier of the specific partner, by the app on the computing device;
to receive, from the identity provider of the publisher by the browser on the computing device, a redirect to a third party identity provider used by the specific partner to authenticate users, the redirect being based, by the identity provider of the publisher on the partner identifier;

to navigate to the third party identity provider, by the browser on the computing device, responsive to the received redirect;

to transmit authentication credentials entered by the user in response to a prompt from the third party identity provider, by the browser on the computing device to the third party identity provider;

to receive a notification on the session identifier that the third party identity provider successfully authenticated the user based on the transmitted authentication credentials, from the notification service by the app on the computing device, the notification having been sent from the identity provider of the publisher in response to receiving a redirected authentication result from the third party identity provider;

to call the identity provider of the publisher with the session identifier, by the app on the computing device, in response to receiving the notification that the third party identity provider successfully authenticated the user; and to receive a secure authentication token, from the identity provider of the publisher by the app on the client.

20. The user operated computing device of claim 19 further comprising:
a mobile computing device.

* * * * *